PHILLIPS B. DRANE
INVENTOR.

BY *James R. Cole*
ATTORNEYS.

Aug. 15, 1939.    P. B. DRANE    2,169,410
BREATHER VALVE AND HATCH FOR TANKS
Filed Oct. 7, 1935    2 Sheets-Sheet 1

PHILLIPS B. DRANE
INVENTOR.
BY James R. Cole
ATTORNEYS.

Patented Aug. 15, 1939

2,169,410

UNITED STATES PATENT OFFICE 2,169,410

BREATHER VALVE AND HATCH FOR TANKS

Phillips B. Drane, Tulsa, Okla.

Application October 7, 1935, Serial No. 43,838

4 Claims. (Cl. 220—44)

My invention relates to new and useful improvements in breather valves and hatches for oil tanks, gasoline tanks, and the like, and has for its chief objects to provide such valves in 5 more convenient form, cheaper to make and install; to provide the exhaust or popoff valve so that its weight alone will normally hold a certain predetermined pressure with additional means for adjusting the valve to higher pressures; to 10 provide a unit assembly of breather valves and to provide a unit assembly of breather valves and hatch for a hatchway in the tank on which the unit is placed. Valves for intake and outlet into and from such tanks, and hatches for said tanks, 15 have heretofore been used, but not in unit assembly as above mentioned nor in the convenient and cheap form in which my device is constructed.

With the above and other objects in view which will appear as the description proceeds, my in20 vention consists of the novel features hereinafter set forth in detail, illustrated in the accompanying drawings and more particularly pointed out in the appended claims.

Referring to the drawings in which numerals of like character designate similar parts thruout 25 the several views.

Figure 1:
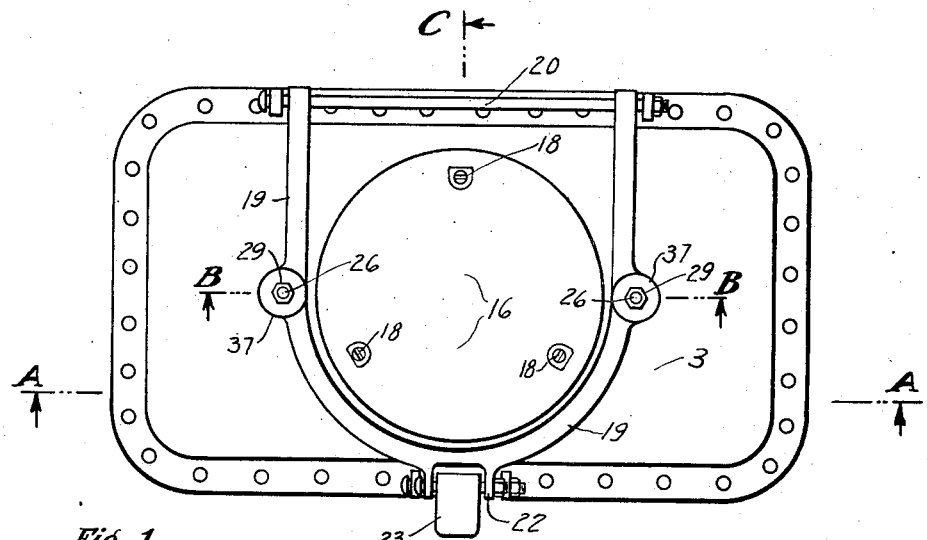
Fig. 1 is a top plan view of my complete unit assembly of breather valves and hatch.
Figure 4:
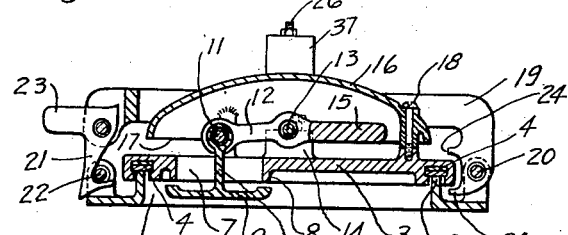

35 Fig. 4 is a transverse section thereof on line C—C of Fig. 1, and wherein the combined hatch and outlet valve is closed and the inlet valve is open.

Figure 5:
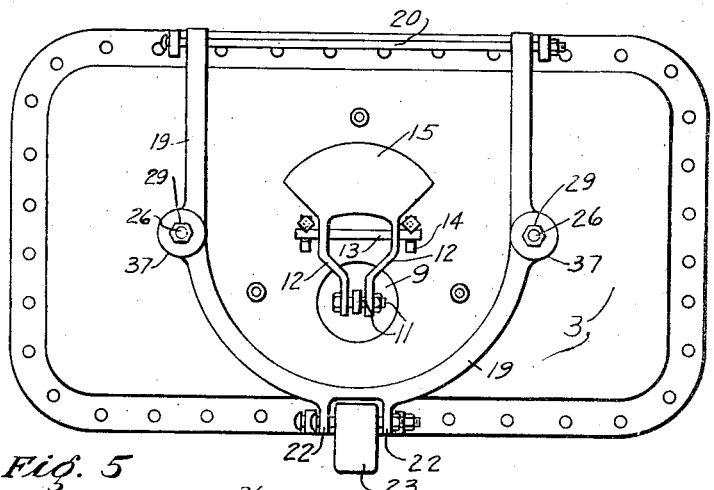

Fig. 5 is a top plan view of my unit assembly 40 of breather valves and hatch, with the protecting hood or cover, for the intake valve and its mechanism, removed.

Figure 6:
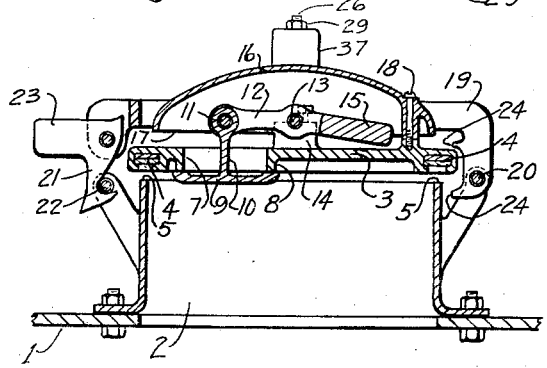

Fig. 6 is a view of my assembly shown in cross section as disclosed in Fig. 4, but showing a high 45 flue or hatchway or hatch collar, on a tank top; and showing the intake valve closed and the combined hatch and outlet valve open but with the hatch as such locked to the hatchway, in which case it functions solely as an outlet valve.

Figure 7:
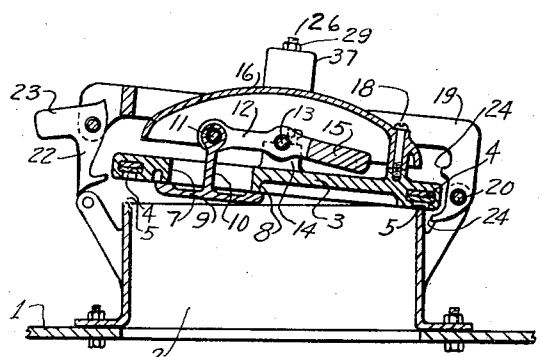

50 Fig. 7 is a view of my assembly shown in cross section as in Fig. 6, but with the intake valve closed and the combined hatch and outlet valve open.

Figure 8:
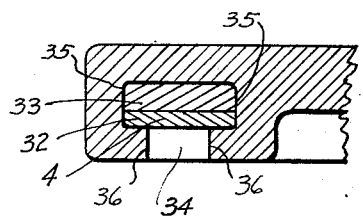

Fig. 8 is a view in cross section of my form of 55 gasket and holding means therefor, for sealing the combined hatch and outlet valve.

Figure 2:
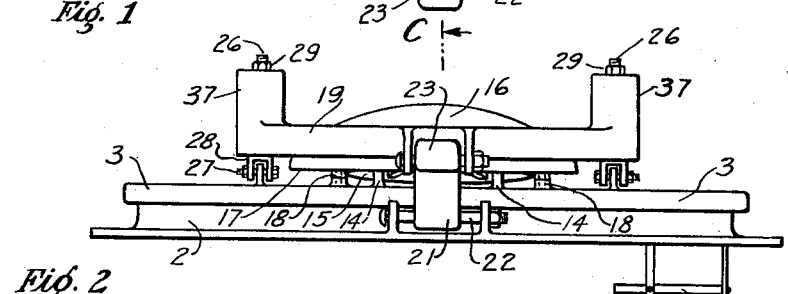
Fig. 2 is a front elevation of the same.
Figure 3:
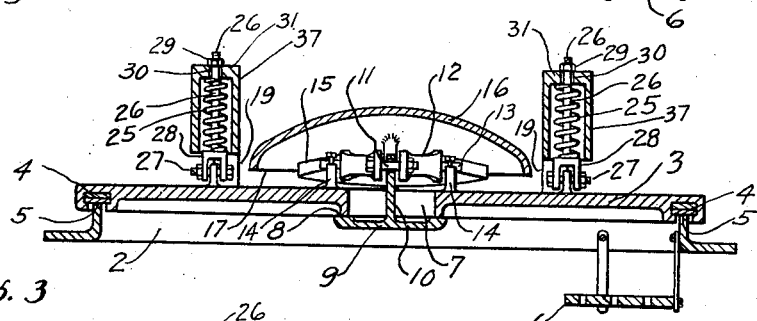
Fig. 3 is a longitudinal cross section thereof 30 on line A—A and B—B of Fig. 1, the line A—A referring to the lower portion of the structure, that is the hatchway and hatch, and the line B—B referring to the structure superimposed on said hatch.

1 represents a tank top and 2 the hatchway thereto, which may be a short flue as illustrated 60 in Figs. 2, 3, and 4, or a tall flue as shown in Figs. 6 and 7, the latter form being used in cases where the tank top is covered with water in which case the flue is of sufficient height to raise the hatch above the surface of the water. 3 represents the combined hatch and outlet valve, the same serving as a cover for said hatchway, and 4 a gasket held in said combined hatch and outlet valve and positioned to bear on the rim or valve seat 5 of said hatchway and thus form the closure. 6 represents a rack or rest secured in the hatchway and whereon an oil thief, used to sample oil in the tank, may be rested.

In said combined hatch and outlet valve which hatch and outlet valve will for brevity be referred to as member 3, is a valve opening 7 having a rim or valve seat 8. An intake valve 9 having a stem 10, is mounted on said member 3 by means of a hinged or pivoted connection 11 between said stem 10 and a lever 12 which is fullcrumed on a pin 13 held in lugs 14 attached to the aforesaid member 3. As will be noted the lever has a two point fulcrum with the points positioned a considerable distance apart with reference to the distance from fulcrum to the weight bearing point of the lever, and by so doing the lever is held against side movement so that the use of valve guides for valve 9 is unnecessary. The lever 12 is weighted at its other end with a weight 15 which may be integral of said lever as is shown in the drawings, and which said weight normally tends to hold said valve 9 on its seat 8 and thus close valve opening 7. The leverage of weight 15 is predetermined to permit valve 9 to open at a predetermined degree of vacuum in the tank. A hood or cover 16 is placed over the intake valve opening 7 and the valve mechanism, to protect the same from the weather and against accident, with the rim 17 of the cover sufficiently clear from the member 3 to permit the valve opening 7 to be open to atmosphere, and is attached to said member 3 by bolts 18.

A yoke 19 is hinged at one end to said hatchway 2, by means of a pivot pin 20 held on said hatchway and positioned clear from member 3, as shown in the drawings. At the other end of the yoke 19 a conventional hinged catch thereon is provided engageable with a latch bolt 22 held on said hatchway and located clear from said member 3, as shown in the drawings. The catch has a hand or finger grip 23, the weight of which urges the catch into a locked position. On each of the arms of said yoke 19 where the same adjoins the pivot pin 20, are two lugs 24 shown in Figs. 4, 6 and 7, positioned to overlap member 3 in manner adapted to steady it and keep it from moving too freely when the hatch is thrown back, as will later be explained.

The yoke carries two compression spring housings 37, in each of which a spring 25 is mounted on a rod 26 the lower end of which is pivotally attached to member 3 by a pin 27 held in lugs projecting from said member 3. The rod 26 has a shoulder 28 near its pivoted end and its free end is threaded to receive a nut 29 and extends thru a hole 30 in the top 31 of said housing 37. The spring 25 is mounted on said rod with one of its ends bearing on the shoulder 28 and the other end bearing on the top 31 of the housing. The nut 29 is placed on said rod outside of the top 31 of the housing, and by turning the nut on the rod the compression of the spring 25 may be adjusted.

The whole spring assembly is loosely fitted so that the member 3 may be free to adjust itself when being seated on its valve seat which is the rim of the hatchway 2. The effect of this arrangement is to permit member 3 to function as an outlet or pop-off valve both when the yoke is latched to the hatchway by the catch 21 and when it is unlatched therefrom. In the latter case it serves as a pop-off valve set against a predetermined pressure by predetermining the weight and leverage of the entire structure carried by it. In the first mentioned case it serves as a popoff valve set against a predetermined pressure of greater strength than that handled when the yoke is unlatched, by causing the springs 25 to exert the desired pressure between member 3 and yoke 19. In practice member 3 and its superstructure is made of aluminum, with its weight and leverage calculated so that with the yoke unlatched it opens as a popoff valve at a pressure of two ounces.

As the member 3 and the structure which it bears, is attached to the hatchway 2 only thru the yoke 19 and its related parts, when the yoke is lifted and the hatch 3 is swung back to provide access to the hatchway, said member 3 is then held suspended on rods 26 and 27 on which pins it is more or less free to swing, except for lugs 24 on yoke 19 which restricts its movement yet permits of sufficient freedom of movement to properly seat member 3 on said hatchway, which proper seating is necessary in order that said member may properly function as a low pressure popoff valve.

The gasket 4 is made of any suitable gasket material 32 and is backed by a very soft resilient material 33 such as a felt or a sponge rubber. In actual practice I use a fiber gasket material backed by a wool felt. With a gasket constructed in this manner it is particularly adapted to seal off large openings such as the hatchway 2 against low pressures, and make possible the use of member 3 as a popoff valve operating at a pressure as low as two ounces and less. The gasket 4 is held on the valve in a groove 34 recessed at both of its sides 35 which provides flanges 36 whereby said gasket may be held in said groove.

For reducing cost of manufacture the seat 8 for the valve 9 is placed flush with the under edge of member 3, or may be positioned beyond it, so that it may be surfaced easily.

In operation, with the combined hatch and popoff valve 3 in place and with the yoke 19 unlatched, when the pressure in the tank becomes great enough to overcome the weight of the member 3 and the further weight carried by it, the member 3 together with its superstructure will raise to open as a popoff valve to relieve the gas pressure in the tank. With the yoke 19 latched, when the pressure in the tank becomes great enough to overcome the weight of member 3 and its superstructure and the compression of springs 25, the member 3 will raise to permit gas to escape from the tank and relieve the pressure therein. In either case the inlet valve 9 will function so that when the pressure in the tank drops below the atmospheric pressure outside of the tank to a point where the difference in pressure is sufficient to overcome the effect of weight 15, the valve will be forced from its seat 8 and permit the outside air to enter the tank to lessen the degree of vacuum existing therein. When it is desired to obtain access to the hatchway 2, the yoke 19 may be thrown back on its hinge, carrying with it the member 3 and all of its superstructure, thus fully clearing said hatchway. When it is desired to close the hatchway, the hatch may be dropped into position and will be automatically locked by the catch 21 which slides over the latch bolt 22 by reason of its beveled end for as previously explained the weight of handle 23 urges the catch to its locked position.

Having thus fully disclosed my invention what I claim and desire to secure by Letters Patent is:

1. The combination of a hatchway for a tank, a combined hatch cover for said hatchway and breather valves for the tank, including a hatch cover adapted for use also as an outlet valve for the tank, an inlet valve for the tank mounted on said hatch cover, a yoke hinged on said hatchway and extending across said hatch cover, latching means for securing said yoke over said hatchway, means for both positioning said hatch cover over said hatchway with an arcuate movement of said yoke and for securing said hatch cover to said yoke in manner such that it is operable as an outlet valve for said tank, one of which means is a rod slidably held by said yoke and pivotally attached to said hatch cover, and another of which means is a compression spring interposed between said yoke and hatch cover and bearing on said yoke and on said rod to normally urge said yoke and hatch cover apart without impairing the function of the pivotal connection between said rod and hatch cover.

2. The combination with a pressure and vacuum relief valve cover plate cooperating with a hatch opening, a hood carried by said cover on the upper side of the cover, of means for mounting said cover, said means comprising a U-shaped member above the cover, said U-shaped member having its arms at opposite sides of the hood, loosely mounted spring actuated connecting members connecting the cover to the arms of the U-shaped member, the arms of the U-shaped member being hingedly mounted to one side of the hatch and latching means carried by the U-shaped member and cooperating with latching means carried by the hatch.

3. A device as set forth in claim 2 including members carried by the arms of the U-shaped member adjacent their hinging point in the plane of the cover, whereby the cover will be supported when in a position other than horizontal.

4. A device as set forth in claim 2 including downwardly extending arms carried by the arms of the U-shaped member, said downwardly extending arms being hingedly connected to the hatch, and recesses in said downwardly extending arms and into which the adjacent side of the cover extends.

PHILLIPS B. DRANE.